J. C. MARKS.
GROWING TROUGH.
APPLICATION FILED MAY 22, 1916.
1,222,648.
Patented Apr. 17, 1917.
2 SHEETS—SHEET 1.
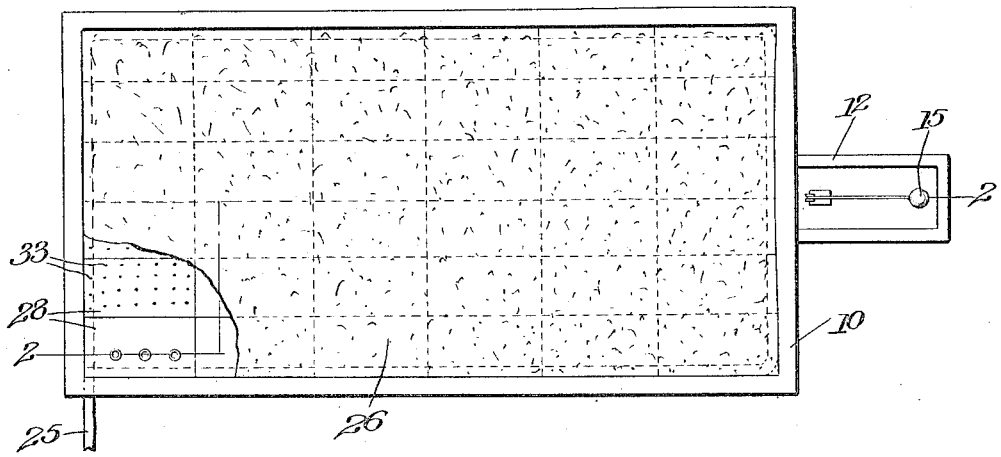
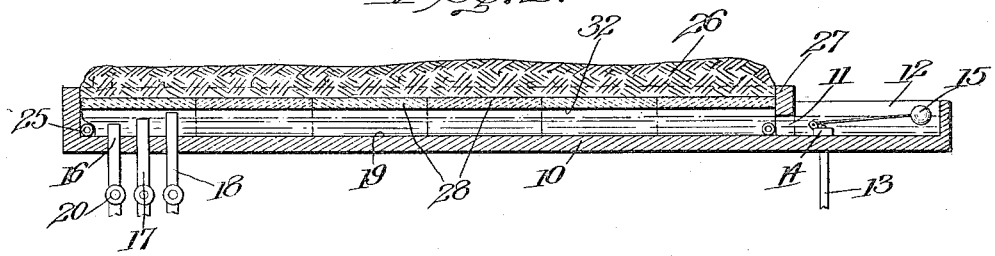
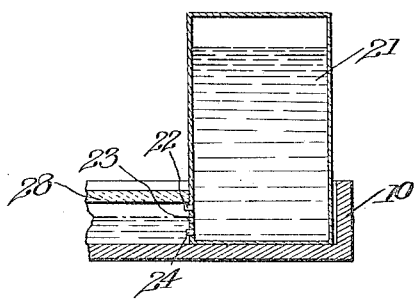
Witnesses
G. T. Baker
E. L. Greenewald
Inventor
John C. Marks
Foster Freeman Watson &c.
Attorney J. C. MARKS.
GROWING TROUGH.
APPLICATION FILED MAY 22, 1916.
1,222,648.
Patented Apr. 17, 1917.
2 SHEETS—SHEET 2.
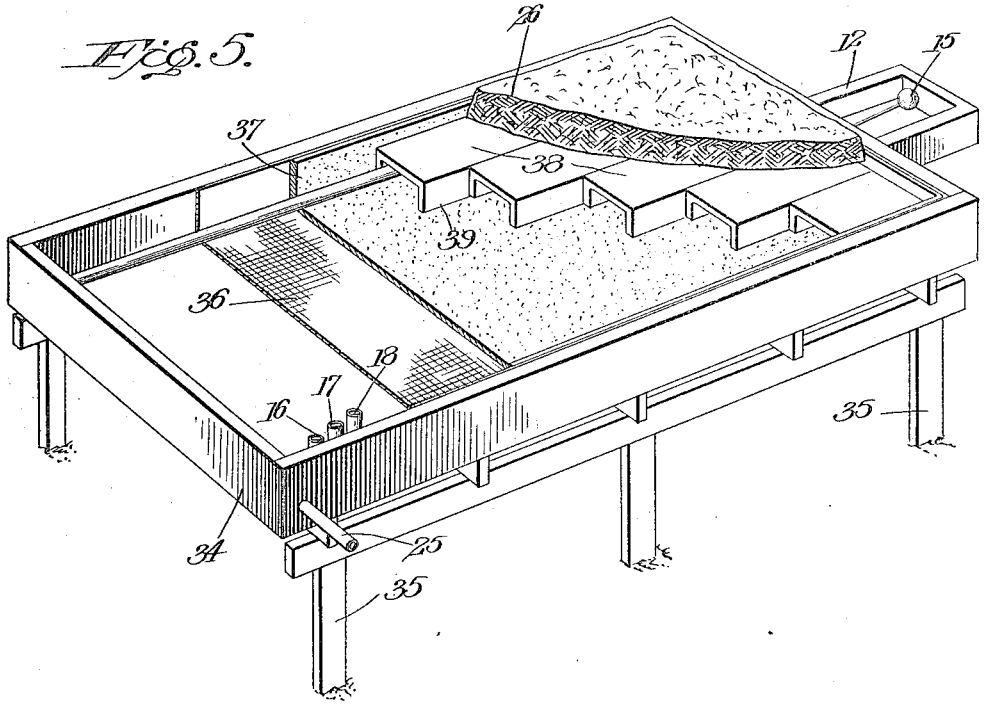
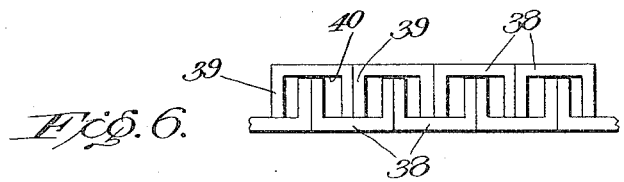

UNITED STATES PATENT OFFICE.

JOHN C. MARKS, OF CHICAGO, ILLINOIS.

GROWING-TROUGH.

1,222,648.

Specification of Letters Patent.

Patented Apr. 17, 1917.

Application filed May 22, 1916. Serial No. 99,166.

*To all whom it may concern:*

Be it known that I, JOHN C. MARKS, a citizen of the United States, and resident of Chicago, Cook county, State of Illinois, have invented certain new and useful Improvements in Growing-Troughs, of which the following is a specification.

My invention relates to growing troughs, greenhouse benches and similar devices for keeping plants supplied with the desired amount of water and for properly supplying them with air.

The principal object of my invention is to provide a trough or bench which is self watering and which will therefore not require experienced labor for watering, resulting in a saving of water expense, labor and attention.

Another object of my invention is to regulate the degree of moistness of the soil in which the plants are grown by merely raising or lowering the water level in the trough, and by also providing an arrangement for supplying air to the roots of the plants.

Still another object is to provide a trough in which the water supply is automatically kept at a predetermined level, and also to provide means for heating the water so that the trough may be used for forcing the growth of plants.

Another object of the invention is to provide a novel form of tile for use in constructing the false bottom of the trough or bench, which bottom supports the soil above the water level.

The above and other objects and the novel features of my invention will be apparent from the following description taken in connection with the accompanying drawing, in which:—

Figure 1 is a plan view of a growing trough embodying my invention;

Fig. 2 is a longitudinal sectional view of the trough shown in Fig. 1, being taken on the broken line 2—2 of Fig. 1;

Fig. 3 is a sectional view of a part of the trough, showing a branch therein by means of which the water in the trough may be kept at a uniform level;

Fig. 4 is a perspective view of a form of tile used in building the false bottom of the trough;

Fig. 5 is a perspective view of a greenhouse bench embodying my invention, parts thereof being broken out to more clearly show the construction of the same; and Fig. 6 is a cross sectional view of a number of tiles showing the manner in which they may be packed together for shipment.

Referring to the drawing and Figs. 1 and 2 in particular, the trough consists of a container 10 which may be rectangular or any other suitable shape. The container 10 shown in Figs. 1 and 2 is made of cement or concrete but may be made of any other suitable water proof material. The container or trough 10 is provided at one end with an inlet 11 through which water may enter the main part of the container from the valve chamber 12. The valve chamber 12 has a pipe 13 leading to it and a valve 14 controls the admission of water from the pipe 13 to the chamber 12, the valve 14 being automatically controlled by a float 15 which opens the valve when the water level is lowered and permits the valve to close when the water level rises above a predetermined point. The float 15 is carried at the outer end of a pivoted rod which presses against the valve stem when the water level lowers and opens a valve to admit water to the container. When the water level rises the float rises moving the pivoted rod away from the valve stem allowing the valve to automatically close and shut off the water. The pipe 13 may be connected to the city pressure pipes.

Near one end the container 10 is provided with a plurality of outlets 16, 17 and 18, the upper ends of which are open at different heights above the bottom 19 of the container. Each of the pipes 16, 17 and 18 is provided with a valve 20 or some other suitable means whereby any two of the pipes may be shut off to keep the water level at the height of the inlet to the other pipe. When it is desired to flood the soil all three of the valves may be closed. As shown in Fig. 2 the water level is controlled by the pipe 17 which is open, however the pipe 18 may also be opened in this arrangement so that if pipe 17 becomes clogged the water will not rise higher than the pipe 18.

In Fig. 3 I have shown another arrangement whereby the level of the water in the container 10 may be kept at a predetermined height. In this form the supply tank 21 is set into the container 10 and at its lower end it is provided with three separate outlets 22, 23, and 24 by means of which the water may be kept at the desired height. The tank being air-tight and nearly full of water, and only one of the outlets at the bottom being open, the water will flow out of the tank through said open outlet until the level of the water is just above the outlet. Whenever the water evaporates or the level goes down, air may enter the tank 21 and water will flow out of the same until the level is restored.

In order to heat the water in the tank for the purpose of forcing the plants I provide a steam pipe 25 which extends around the sides of the tank and when steam is admitted to the same the temperature of the water can be raised to the desired degree.

The container 10 has a false bottom above the water level therein and below the upper edge 27 for supporting the soil 26 in which the plants are grown. The false bottom is made up of a plurality of porous tiles, the top surfaces of which are substantially flat so as to form a continuous floor for the soil 26. In Fig. 4 I have shown a form of tile which is very well adapted for this purpose. The tile is substantially rectangular in shape and has a flat top surface 28. The lower side of the tile is narrower than the top side and consequently the lateral faces 29 are inclined. The downwardly tapering sides 29 allow the top faces 28 of the tiles to fit closer together and thereby prevents the soil from falling through the false bottom at the joints between the tiles. The bottom faces of the tiles are hollowed out as at 30 and the opening thus formed extends almost the entire height of the tile and the purpose of this opening will be explained presently. On both sides of the opening or groove 30 there are flanges 31 which form feet or legs to support the upper end and top surface 28 of the tile above the water level in the container 10. It will be seen that when the tiles are arranged as shown in Figs. 1 and 2 there will be a plurality of grooves extending longitudinally of the container 10 to permit circulation of air beneath the top side 28 of the tile, since when the container is filled with water to the proper level the lower ends of the legs or flanges 31 will support the tiles on the bottom 19 and these legs or flanges will also be below the water level so that the water will be fed to the soil by capillary action through the pores of the tiles. The depth of the grooves 30 is greater than the depth of the water in the container so that there will be an air space 32 above the water level. The air will thus have access to the roots of the plants through the joints between the tiles. The tiles may also be provided with perforations 33 extending from the top face vertically through the tile to permit moisture and air to pass therethrough to the roots of the plants.

In Fig. 5 I have illustrated my invention as applied to the ordinary greenhouse bench. In this construction the wooden tray 34 supported on legs 35 is provided on the inside with a lining 36 of canvas or similar material upon which a lining 37 of cement or other waterproofing material is deposited. This makes the wooden bench suitable as a container for water. The porous tiles 38 of this form are merely of a slightly different shape from the tiles shown in Figs. 1, 2 and 4. These tiles are provided with flat upper faces to form a continuous level floor for the soil and also have side flanges 39 to support the tiles on the lining 37 of the bottom of the tray and to provide the means for feeding the water to the soil and roots of the plants. The grooves 40 between the flanges 39 are also of sufficient height so that an air space will be formed above the water level, except when the soil is flooded. The tiles 38 are designed so that they may be readily packed together in a small space for shipment and I have shown the manner of packing them in Fig. 6 where it will be seen that the grooves 40 are placed face to face with the flanges of the lower tiles fitting into the grooves of the upper tiles. The tray 34 is provided with the means for controlling the water level and with the heating means shown in the construction illustrated in Figs. 1 and 2.

By means of the bench herein shown the soil may be flooded or kept at any other degree of moisture by raising or lowering the water level. The arrangement also requires very little attention and saves water expense. The device is self watering and self regulating and may be made self fertilizing by putting chemical fertilizer into the water which is fed beneath the false bottom. The container may be used as a receptacle for self watering flower pots. The device is particularly suitable for show windows and similar places where the plants cannot be given much attention.

While I have shown and described my invention in detail I do not wish to be limited to the exact features illustrated as it will be clear that modifications may be made in the details of construction without departing from the spirit of the invention.

Having thus described the invention, what is claimed and desired to be secured by Letters Patent is:

1. In a self watering growing trough, the combination of a container for water, means for automatically maintaining a predetermined level of water in said container, and a false bottom for said container consisting of a plurality of porous tiles provided with top faces forming a substantially continuous floor for supporting soil above the normal water level in said container, said tiles also having portions extending below the normal water level to feed water to the soil by capillary action through the pores of the tiles.

2. In a self watering growing trough, the combination of a container for water, and a false bottom for said container consisting of a plurality of porous tiles provided with top faces forming a continuous floor for supporting soil above the water level in said container, the bottom sides of said tiles being hollowed out to form air circulating spaces above the water level in the container and also to form integral parts extending below the water level to support the tiles in the container and to feed the water to the soil by capillary action through the pores of the tiles.

3. In a self watering growing trough, the combination of a container for water having an automatically controlled inlet and a plurality of outlets located at different levels from the bottom of the container, and a false bottom for said container consisting of a plurality of porous tiles provided with top faces forming a substantially continuous level floor for supporting soil above the water level in said container, the bottom sides of said tiles being hollowed out to form air circulating spaces above the water level in the container and also to form feet integral with the tiles extending below the water level to support the tiles in the container and to feed the water to the soil by capillary action through the pores of the tiles.

4. In a self watering growing trough, the combination of a container for water, and a false bottom for said container consisting of a plurality of porous tiles having perforations extending therethrough from the top to the bottom, the top faces thereof being substantially flat and forming a continuous level floor for supporting soil above the water level in said container.

5. In a self watering growing trough, the combination of a container for water and a false bottom for said container formed by a plurality of porous tiles, the top faces of which provide a substantially continuous floor for supporting soil above the water level in said container, the bottom sides of said tiles resting on the bottom of said container, the tiles having air circulating spaces therein located above the water level in the container.

6. In a self watering growing trough, the combination of a container, means for automatically maintaining a predetermined level of water in said container, means for heating the water in said container, and a false bottom for said container comprising a plurality of porous tiles provided with top faces forming a continuous floor for supporting soil above the water level in said container, the lower sides of said tiles extending below the water level and having air circulating spaces therein above the water level.

7. A porous tile for use in forming a porous false bottom for a growing trough, greenhouse bench, or similar device, said tile comprising a top part wider than the bottom part thereof, said top part having a substantially flat upper surface, a hollowed out portion below the top side of said tile and parts integral with said tile for supporting the same on the floor of the trough or bench.

8. A porous tile for use in building false bottoms for growing troughs, greenhouse benches and the like, said tile comprising a substantially rectangular body narrower at the bottom than at the top, and having perforations extending therethrough, the top side of the tile being substantially flat and having lateral faces inclined to the top side, said tile also having a hollowed out portion below the top side thereof for the purpose set forth.

9. In a self watering growing trough, the combination of a container for water, means for automatically maintaining the water in said container at any one of a plurality of different levels, and a false bottom for supporting soil above the water level in said container.

10. In a self watering growing trough, the combination of a container for water, means for automatically maintaining the water in said container at any one of a plurality of different levels, and a false bottom consisting of porous tiles having substantially flat top faces forming a substantially continuous flat surface adapted to carry soil thereon, portions integral with the under sides of said tiles extending below the water level and supporting the tiles on the floor of said container, said tiles having cavities in the under sides thereof to provide air spaces above the water level, the water level being adjustable to regulate the degree of moistness for the plants in the trough and also to regulate the size of the air spaces between the water level and the lower sides of the tiles.

11. A growing trough of the class described comprising a container for water, having an automatically controlled water inlet and a plurality of outlets arranged to maintain the water at any one of a plurality of different heights so as to regulate the degree of moistness for the plants in the trough.

12. In a self watering greenhouse bench, the combination of a container for water consisting of a wooden tray having a lining of waterproof material, and a false bottom for said container consisting of a plurality of porous tiles having their top faces flat and forming a substantially continuous level floor and provided with means for supporting the tops thereof and the soil thereon above the water level in the container.

In testimony whereof I affix my signature.

JOHN C. MARKS.